United States Patent
Gong et al.

(10) Patent No.: US 11,578,747 B2
(45) Date of Patent: Feb. 14, 2023

(54) THREADED FASTENER

(71) Applicant: Illinois Tool Works Inc., Glenview, IL (US)

(72) Inventors: Yongping Gong, Wilmette, IL (US); Victor Truong, Chicago, IL (US); Stanley J. Cabaj, Park Ridge, IL (US); Mark D. Latz, Oak Forest, IL (US); Michael C. Dill, Elk Grove Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 471 days.

(21) Appl. No.: 16/795,071

(22) Filed: Feb. 19, 2020

(65) Prior Publication Data
US 2020/0182280 A1    Jun. 11, 2020

Related U.S. Application Data

(63) Continuation of application No. 15/800,865, filed on Nov. 1, 2017, now Pat. No. 10,570,943.

(Continued)

(51) Int. Cl.
*F16B 25/00*    (2006.01)
*F16B 39/282*    (2006.01)

(52) U.S. Cl.
CPC ...... *F16B 25/0063* (2013.01); *F16B 25/0026* (2013.01); *F16B 25/0052* (2013.01);
(Continued)

(58) Field of Classification Search
CPC .. F16B 25/00; F16B 25/0026; F16B 25/0052; F16B 25/0057; F16B 25/0063;
(Continued)

(56) References Cited

U.S. PATENT DOCUMENTS

RE626 E    11/1858 Sloan
1,764,053 A    6/1930 Reed et al.
(Continued)

FOREIGN PATENT DOCUMENTS

CA    2 708 419    12/2011
CN    201561026    8/2010
(Continued)

OTHER PUBLICATIONS

Tapcon ¼ in.×2-3/4 in. Hex-Washer-Head Concrete Anchors (75-pack), retrieved from the Internet at https://www.homedepot.com/p/Tapcon-1-4-in-x-2-3-4-in-Hex-Washer-Head-Concrete-Anchors-75-Pack-24330/100098197, on Oct. 31, 2017 (available before Nov. 16, 2016)(12 pages).

(Continued)

*Primary Examiner* — Roberta S Delisle
(74) *Attorney, Agent, or Firm* — Neal, Gerber & Eisenberg LLP (57) ABSTRACT

Various embodiments of a fastener driveable into a substrate are provided. The fastener includes a head, a shank, and a helical thread formation. Portions of the shank and helical thread formations may be tapered. The outer diameter of the shank may decrease in a direction away from the head. An outer diameter of the thread formation may increase in a direction away from the head. The head may include a plurality of extending ribs. The helical thread formation may be formed with a plurality of grooves that are respectively each partially defined by a straight cutting edge. These improvements reduce torsional failure of the fastener from over tightening.

21 Claims, 11 Drawing Sheets

Related U.S. Application Data (60) Provisional application No. 62/422,978, filed on Nov. 16, 2016.

(52) U.S. Cl.
CPC .......... *F16B 25/0078* (2013.01); *F16B 25/00* (2013.01); *F16B 25/0057* (2013.01); *F16B 25/0068* (2013.01); *F16B 25/0073* (2013.01); *F16B 39/282* (2013.01)

(58) Field of Classification Search
CPC .............. F16B 25/0068; F16B 25/0073; F16B 25/0078; F16B 39/282
USPC .......................................... 411/411, 412, 417
See application file for complete search history.

(56) References Cited

U.S. PATENT DOCUMENTS

| | | |
|---|---|---|
| 3,389,734 A | 6/1968 | Gutshall |
| 3,540,509 A | 11/1970 | Gutshall |
| 3,937,119 A | 2/1976 | Ernst |
| 4,223,711 A | 9/1980 | Tabor |
| 4,518,294 A | 5/1985 | Barth |
| 4,705,441 A | 11/1987 | Arnold |
| 4,749,319 A | 6/1988 | Sygnator |
| 4,764,066 A | 8/1988 | Terrell et al. |
| 4,812,095 A | 3/1989 | Piacenti et al. |
| 4,936,395 A | 6/1990 | Enderle |
| 5,863,167 A | 1/1999 | Yoshihiro |
| 5,885,041 A | 3/1999 | Giannuzzi et al. |
| 6,382,892 B1 | 5/2002 | Hempfling |
| 6,976,818 B2 | 12/2005 | Levey et al. |
| 7,156,600 B2 | 1/2007 | Panasik et al. |
| 8,322,960 B2 | 12/2012 | Gong et al. |
| 8,348,575 B2 | 1/2013 | Walther |
| 8,419,332 B2 | 4/2013 | Kochheiser |
| 8,511,958 B2 | 8/2013 | Chang |
| 8,864,430 B2 | 10/2014 | Su |
| 9,297,402 B2 | 3/2016 | Hughes |
| 10,570,943 B2 * | 2/2020 | Gong ................... F16B 25/0026 |
| 2004/0184897 A1 * | 9/2004 | Levey ..................... F16B 39/30 411/411 |
| 2010/0158634 A1 | 6/2010 | Walther |
| 2011/0002753 A1 * | 1/2011 | Gong .................. F16B 25/0026 411/412 |
| 2011/0014007 A1 | 1/2011 | Gaudron et al. |
| 2011/0176888 A1 * | 7/2011 | Gaudron ............. F16B 25/0026 411/394 |
| 2014/0119852 A1 * | 5/2014 | Lee ..................... F16B 25/0068 411/412 |
| 2020/0182280 A1 * | 6/2020 | Gong .................. F16B 25/0026 |

FOREIGN PATENT DOCUMENTS

| | | |
|---|---|---|
| EP | 1 939 466 | 7/2008 |
| EP | 2 339 189 | 6/2011 |
| EP | 2 458 233 | 5/2012 |
| EP | 2 980 424 | 2/2016 |
| WO | WO 2015/022049 | 2/2015 |

OTHER PUBLICATIONS

Communication Relating to the Results of the Partial International Search (Annex to Form PCT/ISA/206) and Provisional Opinion accompanying the Partial Search Results for International Application No. PCT/US2017/059662, dated Jan. 23, 2018 (9 pages).

International Search Report and Written Opinion for International Application No. PCT/US2017/059662, dated Apr. 3, 2018 (14 pages).

Extended European Search Report for European Application No. 2116792.8, dated Jun. 22, 2021 (10 pages).

\* cited by examiner

THREADED FASTENER

PRIORITY

This patent application is a continuation of and claims priority to and the benefit of U.S. patent application Ser. No. 15/800,865, which was filed on Nov. 1, 2017, which claims priority to and the benefit of U.S. Provisional Patent Application Ser. No. 62/422,978, filed Nov. 16, 2016, the entire contents of which are incorporated herein by reference.

BACKGROUND

The present disclosure relates generally to threaded fasteners that are drivable into a substrate, and more particularly to improved one piece threaded anchors.

Threaded fasteners such as anchors are well known and commercially used throughout the world for securing objects to a variety of substrates. A variety of threaded fasteners can be used to secure objects to concrete, masonry, and other cementitious substrates. Typically, such threaded fasteners include a head, a shank, and a thread formation on the shank for frictionally engaging the substrate into which the fastener is driven. The head typically includes a mechanical engaging structure for engagement by a tool that is used to rotate the threaded fastener and drive the threaded fastener into the substrate.

Often such threaded fasteners are optimally used by pre-drilling the concrete, masonry, or other substrate, for example with a hammer drill equipped with a masonry drill bit. Once the substrate has been pre-drilled, and a correctly sized cavity formed therein, an appropriately sized threaded fastener may be driven or screwed into the substrate to secure an object thereto. One example of such a threaded fastener is described in U.S. Pat. No. 8,322,960 entitled "Threaded Concrete Anchor" and assigned to Illinois Tool Works, Inc. in Glenview, Ill. (who is also the assignee of this patent application). Such fasteners are commercially distributed under the Tapcon® mark, and are sometimes referred to as Tapcon screws or anchors. Tapcon is a registered trademark of Illinois Tool Works, Inc.

Often such threaded fasteners are driven into such a substrate using a powered tool, such as an electric or pneumatic power driving tool or impact driver that imparts a rotational force or torque on the threaded fastener. For example, an impact driver may be fitted with an appropriate bit or socket for engaging the complimentary mechanical engaging structure of the head of the threaded fastener, to rotate the threaded fastener in a tightening direction such that the threads of the threaded fastener engage the substrate. When the threaded fastener is rotated in a tightening direction, the threads of the threaded fastener grip the inside surfaces of the substrate that define the cavity (e.g., the surfaces that define the pre-drilled hole in the substrate), causing the threaded fastener to be driven deeper into the substrate until the head of the threaded fastener comes into contact with either the object being attached by the threaded fastener to the substrate (such as a bracket, flange, clip, or other mechanical device having a hole in it through which the fastener passes). This contact thereby prevents the threaded fastener from being driven, rotated, or tightened further. This results in the threaded fastener being fully tightened and the object being affixed to, secured to, or compressed into contact with the substrate.

Certain problems have arisen due to improvements in electric and pneumatic power driving tools that have caused such tools to become capable of delivering relatively higher levels of torque. When such driving tools are used to drive certain known threaded fasteners, such as those described above, the threaded fasteners can be subjected to relatively large amounts of torque from the rotational forces imparted by these power driving tools. For example, as the threads of the threaded fastener engage the substrate, the threaded fastener experiences frictional resistance forces which tend to impede further driving of the threaded fastener into the substrate. At the same time, the power driving tool is imparting a rotational force or torque on the threaded fastener (typically via the head of the threaded fastener) in an effort to rotate the threaded fastener in a tightening direction and drive it into the substrate. These opposing forces impart significant torsional stresses on the threaded fastener, placing the shank of the threaded fastener under shearing torsional stresses.

These torsional stresses can be so great in various circumstances as to cause the threaded fastener to fail due to the opposing forces or torques placed on the threaded fastener. Over tightening of such threaded fasteners during the driving process is a primary cause of such overstressing of the shank of the threaded fastener, and can result in failure of the threaded fastener due to excessive torsional forces. Threaded fasteners that are subjected to over tightening often fail along the shank, including an upper portion of the shank adjacent to the head of the threaded fastener. Other failures occur at the top of the shank, just under the head of the threaded fastener.

Accordingly, there is a need to provide threaded fasteners that solve these and other problems.

SUMMARY

Various embodiments of the present disclosure provide an improved threaded fastener drivable into a substrate that solves the above problems. For brevity, the threaded fastener of the present disclosure may sometimes be referred to herein as the fastener or the anchor (or threaded anchor).

In various embodiments of the present disclosure, the fastener or anchor includes: (i) a head; (ii) a shank connected to the head at a first end and forming or having a tip at a second end; and (iii) a first helical thread formation extending outwardly or transversely from the shank. The shank has a first portion proximate the head, a second portion adjacent to the tip, and a third portion between the first and second portions. The shank has a longitudinal axis extending from the head to the tip. The first portion has a substantially constant outer diameter along a length of the shank. The second portion has a substantially constant outer diameter along the length of the shank. The third portion has an outer diameter that decreases along the length of the shank in a direction along the longitudinal axis from the head to the tip. The first helical thread formation has a thread form formed from two portions disposed upon opposite lateral sides of the thread form. The thread form has a root positioned along the second and third portions of the shank. The outer diameter of the first helical thread formation on the third portion of the shank increases along the length of the shank in a direction along the longitudinal axis from the head to the tip.

In various embodiments of the present disclosure, an outer surface of the third portion of the shank forms an angle α with the longitudinal axis, and the outer diameter of the first helical thread formation on the third portion of the shank forms an angle β with the longitudinal axis.

In other various embodiments of the present disclosure, the fastener includes: (i) a head; (ii) a shank connected to the head at a first end and forming or having a tip at second end;

and (iii) a first helical thread formation extending outwardly or transversely from the shank. The shank has a first portion proximate the head, a second portion proximate the tip, and a third portion between the first and second portions. The first helical thread formation extends from the shank and has a thread formed from two portions disposed upon opposite lateral sides of the thread form. The thread form has a root positioned along the second and third portions of the shank. The head includes a top portion distal from the shank, and a bottom portion adjacent to the shank. The top portion of the head defines a, mechanical engaging structure engageable by a tool. The bottom portion of the head includes a bottom surface and a plurality of ribs arranged radially around an axis of the head. The ribs extend outward from the bottom surface in a direction towards the tip. The ribs are shaped to frictionally engage a face of an object being attached to a substrate into which the fastener is driven as ribs and the bottom surface approaches and ribs comes into contact with object being attached to the substrate.

In various embodiments of the present disclosure, each of the plurality of ribs of the bottom portion of the head includes a leading face and a trailing face, wherein the leading face is configured to engage a surface of the object being attached to the substrate as the fastener is driven through the object and into the substrate.

In various embodiments of the present disclosure, the leading face forms an angle θ with the bottom surface, wherein θ is less than 90 degrees and greater than 45 degrees.

In various embodiments of the present disclosure, the one or more of the thread formations or threads of the threaded fastener are formed with one or more grooves that are each partially defined by a straight cutting edge in the thread formation or thread. The straight cutting edge assists the thread formation or thread in cutting into the substrate (such as a concrete substrate). This enables the threaded fastener to form its path more efficiently, reduces necessary installation torque, and reduces the likelihood of breakage of the threaded fastener during installation or use.

Other objects, features, and advantages of the present disclosure will be apparent from the following detailed disclosure, taken in conjunction with the accompanying sheets of drawings, wherein like reference numerals refer to like parts.

DETAILED DESCRIPTION

Referring now to the Figures, a threaded fastener 100 of one example embodiment of the present disclosure is generally shown in FIGS. 1, 2, 3, and 4. The fastener 100 is configured for use in fastening such as anchoring in substrates, and in particular for securing or anchoring objects or portions of objects to concrete, masonry, or other substrates as described herein. The fastener 100 includes a head 110, a shank 150, and thread formations 120 and 130 extending outwardly from the shank 150. The shank 150 has a length L1 and is integrally connected to the head 110 at a first end 152 of the shank 150. Generally opposite the first end 152 of the shank 150 is a second end 154 of the shank 150 which forms a tip 156. The tip 156 is pointed to aid in penetrating the substrate in which the fastener 100 is being driven, as described herein.

Figure 1:
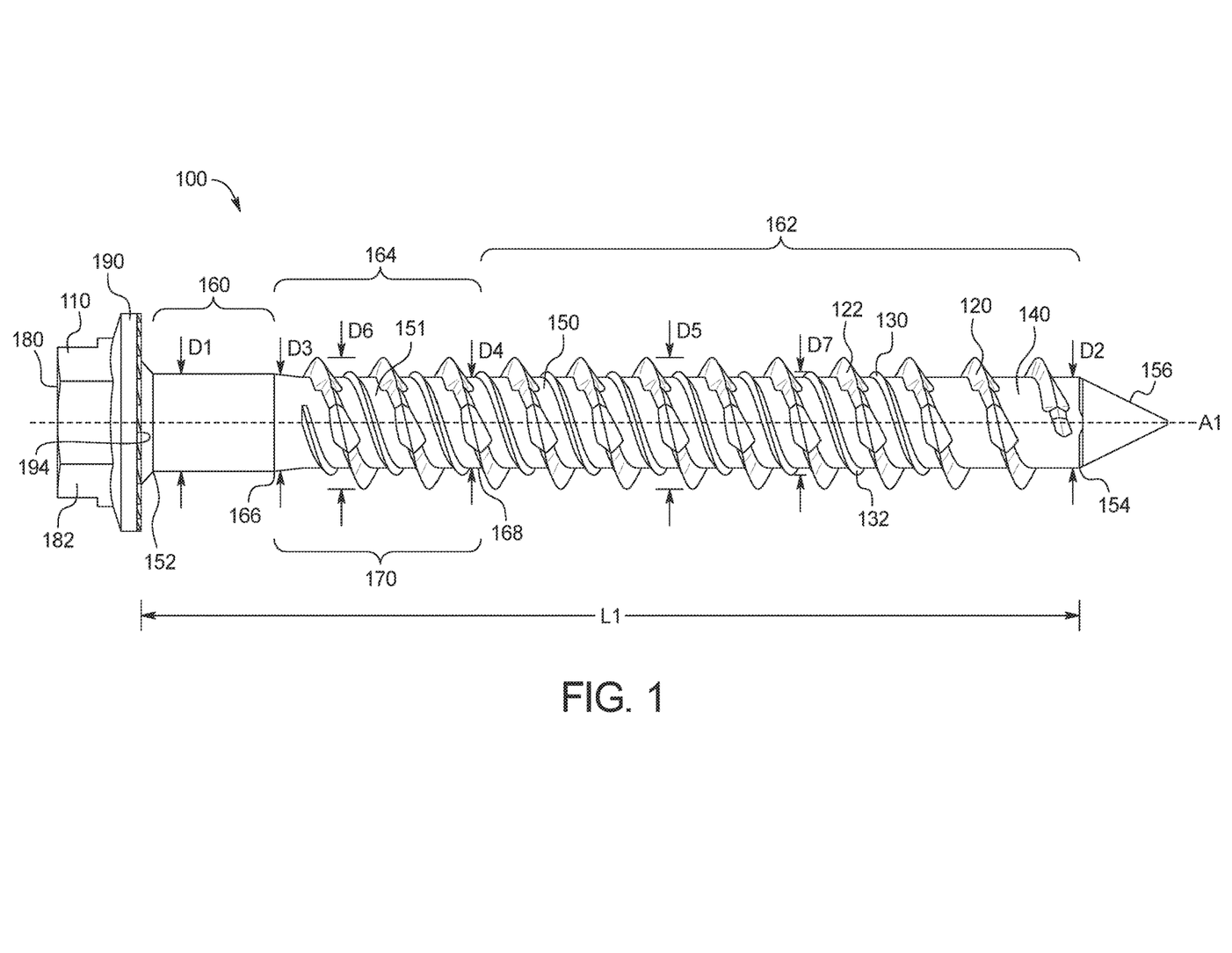
FIG. 1 is a side perspective view of one example embodiment of a threaded fastener of the present disclosure.

The shank 150 includes a first portion 160 adjacent to the head 110, a second portion 162 adjacent to the tip 156, and a third portion 164 generally between the first portion 160 and the second portion 162. The shank 150 has a longitudinal axis A1 extending along the length L1 of the shank 150, generally from the head 110 to the tip 156. The first portion 160 of the shank 150 extends from the head 110 to the third portion 164, and has a substantially constant outer diameter D1 along the length L1 of the first portion 160 of the shank 150. Thus, the outer diameter of the end of the first portion 160 abutting the head 110 is substantially the same as the outer diameter of the opposite end of the first portion 160 abutting the third portion 164.

The second portion 162 of the shank 150 extends from the third portion 164 on one end, to the tip 156 of the shank 150 on the other end, and has a substantially constant outer diameter D2 along the length of the second portion 162 of the shank 150 (excluding the tip 156). Thus, the outer diameter of the end of the second portion 162 abutting the third portion 164 is substantially the same as the outer diameter of the opposite end of the second portion 162 abutting the tip 156.

The third portion 164 of the shank 150 is generally positioned between the first portion 160 and the second portion 162, and serves as a transition area 170 of the shank 150. The outer diameter D3 of a first end 166 of the third portion 164 of the shank 150 is substantially equal to the outer diameter D1 of the first portion 160 of the shank 150. The outer diameter D4 of a second end 168 of the third portion 164 of the shank 150 is substantially equal to the outer diameter D2 of the second portion 162 of the shank 150. In this illustrated example embodiment, the outer diameter D2 of the second portion 162 is less than the outer diameter D1 of the first portion 160. Thus, the transition area 170 of the third portion 166 serves to enable the shank 150 to taper from the outer diameter D3 at the first end 166 to the outer diameter D4 at the second end 168 of the third portion 166. In this way, the outer diameter from D3 to D4 of the third portion 166 decreases along the length L1 of the shank 150 in a direction along the longitudinal axis A1 moving from the head 110 to the tip 156. Thus, the outer diameters D3 to D4 of the third portion 166 of the shank 150 taper radially inwardly along a length L1 of the shank 150 in the direction from the head 110 towards the tip 156. In this illustrated embodiment, the rate of the taper is constant; however it should be appreciated that the rate of the taper may vary in accordance with the present disclosure.

As shown in FIGS. 1, 2, 3 and 4, the fastener 100 of this example embodiment of the previous disclosure further includes a first or primary helical thread formation 120 along or extending outwardly or transversely from a portion of the shank 150. In this illustrated example embodiment, the first helical thread formation 120 spans substantially all of the second and third portions 162 and 164 of the shank 150. The first helical thread formation 120 includes a thread 122 extruding from a fastener root 140. The root 140 spans substantially all of the second and third portions 162 and 164 of the shank 150, between the tip 156 and the first portion 160 of the shank 150. The first helical thread formation 120 traverses the root 140 in a helical or spiral formation along a surface of the root 140 in the direction of the longitudinal axis A1.

Figure 2:
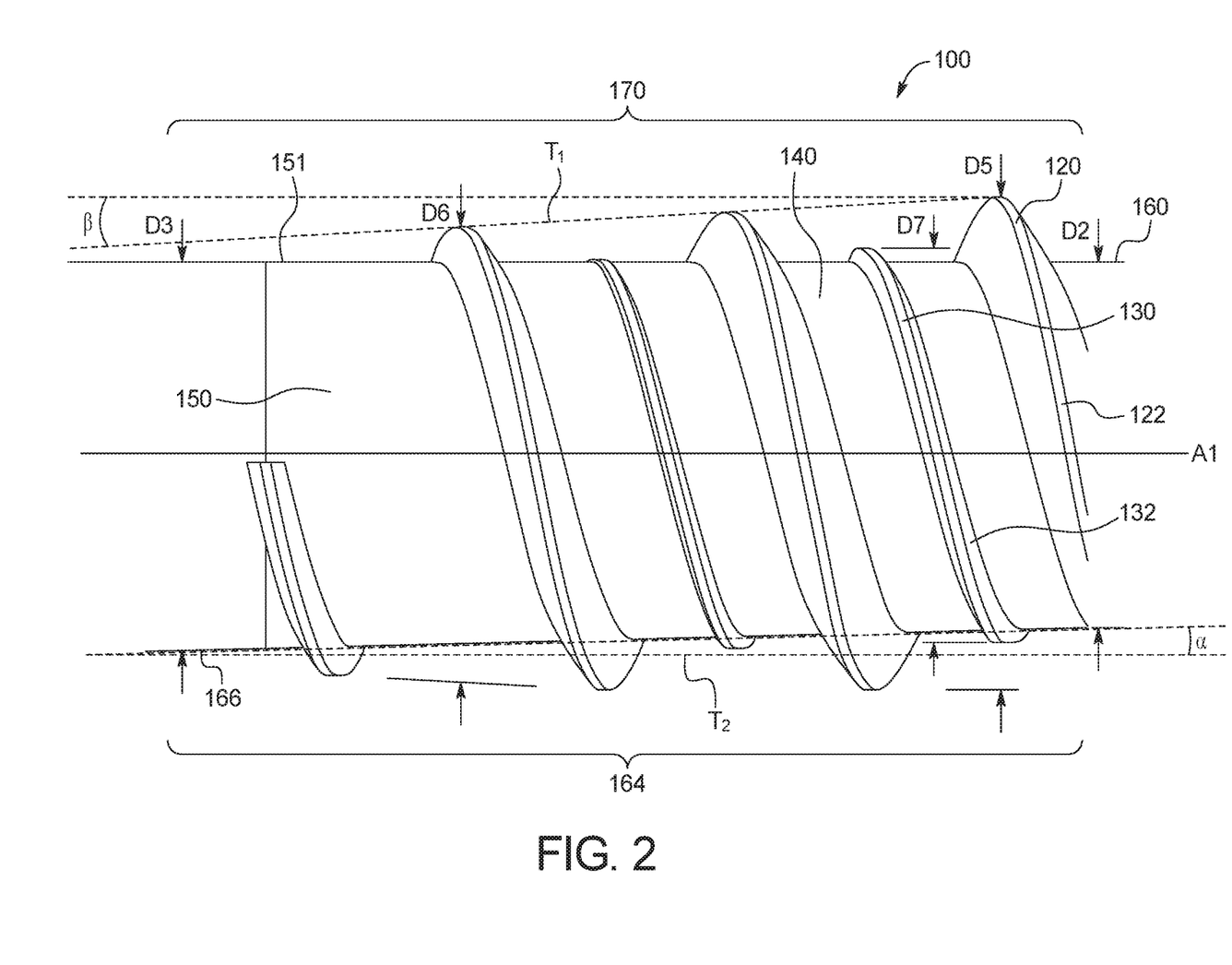
FIG. 2 is an enlarged fragmentary side perspective view of a portion of a third portion, or transition area, of the shank of the threaded fastener of FIG. 1.
Figure 3:
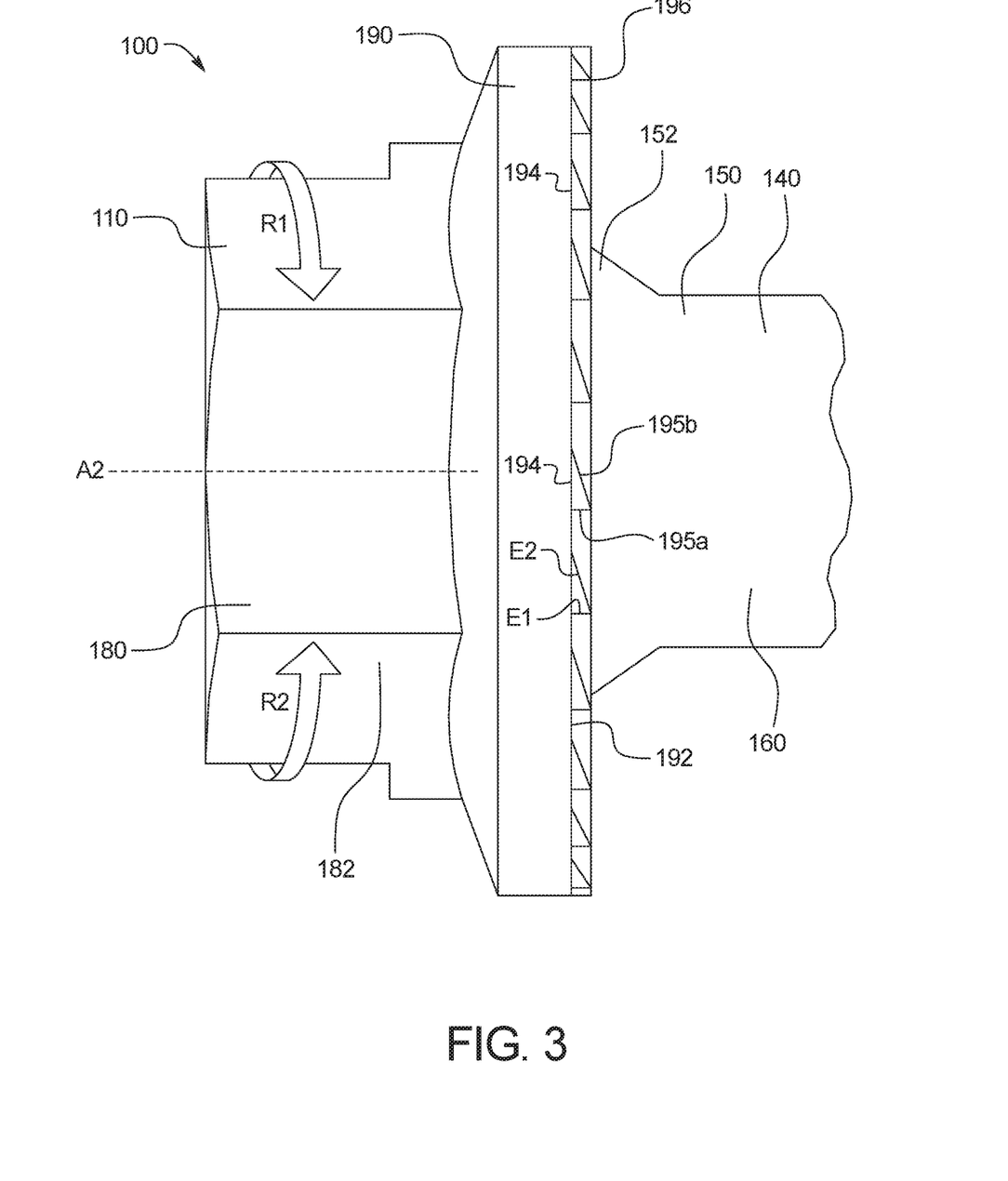
FIG. 3 is an enlarged fragmentary side perspective view of the head of the threaded fastener of FIG. 1.

The first helical thread formation 120 has an outer diameter D5, as shown in FIG. 1. The outer diameter D5 of the first helical thread formation 120 is substantially constant along the length of the second portion 164 of the shank 150. However, in various embodiments of the present disclosure, the outer diameter of the first helical thread formation 120 is tapered on the third portion 166 of the shank 150. For example, as shown in FIG. 2, the outer diameter of the first helical thread formation 120 may decrease from a first end 166 of the third portion 164 to a second end 168 of the third portion 164 in a direction along the longitudinal axis A1 of the shank 150 from the tip 156 to the head 110 or part thereof. Thus, the outer diameter D5 of the first helical thread formation 120 at the first end 166 of the third portion 166 in this illustrated embodiment is larger than the outer diameter D6 of the first helical thread formation 120 adjacent to the second end 168 of the third portion 164. In this way, the outer diameters D6 and D5 of the first helical thread formation 120 on the third portion 166 of the shank 150 increase along the length L1 of the shank 150 in a direction along the longitudinal axis A1 from the head 110 to the tip 156. Thus, the outer diameters D6 and D5 of the first helical thread formation 120 on the third portion 166 of the shank 150 taper radially outwardly along a length L1 of the shank 150 in the direction from the head 110 towards the tip 156.

The illustrated example threaded fastener 100 also includes a second or secondary helical thread formation 130. Similar to the first helical thread formation 120, the second helical thread formation 130 includes a thread 132 extruding from the fastener root 140. The second helical thread formation 130 traverses the root 140 in a helical or spiral formation along a surface of the root 140 in the direction of the longitudinal axis A1.

In this illustrated example embodiment, the thread 132 of the second helical thread formation 130 is positioned between the thread 122 of the first helical thread formation 120. As shown in FIG. 1, the second helical thread formation 130 is or runs generally parallel to the first helical thread formation 120, with the threads 122 and 132 of each of the thread formations 120 and 130, respectively generally radially positioned on opposite sides of the root 140 along the length L1 of the shank 150. In various embodiments, both threads 122 and 132 are generally parallel and forming approximately the same angle with the axis A1. However, in alternative embodiments of the present disclosure, the threads 122 and 132 may be configured with differing angles to the axis A1, or differing thread pitches.

It should be appreciated that the formation and configuration of the threads 122 and 132 of the respective first and second helical thread formations 120 and 130 may take on a variety of different forms in accordance with the present disclosure. In one embodiment, the threads 122 and 132 are formed in a manner to maximize grip strength of the fastener 100 for use in concrete, masonry, and other cementitious substrates. One example of threads which may be appropriate for certain applications of the threads 122 and 132 of the present disclosure are described in U.S. Pat. No. 8,322,960 entitled "Threaded Concrete Anchor" and assigned to Illinois Tool Works, Inc. in Glenview, Ill., which is hereby incorporated in its entirety as if fully set forth herein.

In the example embodiment shown in FIGS. 1, 2 3, and 4, the outer diameter D7 of the second helical thread formation 130 is substantially constant along the length L1 of the shank 150 along the longitudinal axis A1. In other embodiments, the outer diameter of the second helical thread formation 130 tapers similar to the tapering of the first helical thread formation 120 described herein. The second helical thread formation 130 may also be configured to taper on the third portion 166 of the shank 150, or on any other appropriate portions 162 and 164 of the shank 150. In an alternative embodiment, shown in FIG. 5, the second helical thread formation 130 includes a plurality of threads 132a and 132b that are positioned between the threads 122 of the first helical thread formation 120. In various embodiments, the first and second helical thread formations 120 and 130 include any suitable appropriate number of helical threads 122 and 132, which may be the same, similar, or differing in size, orientation, pitch, or configuration.

The tapering of the shank 150 and the first helical thread formation 120 on the third portion 166 of the shank 150 is depicted in greater detail in FIG. 2. The tapering occurs across the transition area 170 of the third portion 166. As explained herein, the diameter of the shank 150 of the third portion 166 uniformly decreases from a first outer diameter D3 to a second outer diameter D4 (see FIG. 1) to form a tapering of the shank 150, where the outer diameters D3 and D4 are the measurements from the outer surface 152 of the shank 150 to the radially opposite outer surface 152 of the shank 150. This tapering causes the outer surface 151 of the third portion 166 of the shank 150 to form an angle α between the outer surface 151 and the longitudinal axis A1, as shown in FIG. 2. The preferred angle α is varied with diameter D1, the larger of D1 is, the larger α. In a preferred embodiment, for ¼ inch or smaller diameter anchors, angle α is approximately 1.0 degrees, and is preferably between 0.5 and 2 degrees. For larger size anchors, the angle is not as important as smaller size anchors, and the angle α could be as large as 15 degree.

Similarly, the tapering of the first helical thread formation 120 occurs across the transition area 170 of the third portion 166. As explained herein, the outer diameter of the first helical thread formation 120 increases from a first outer diameter D6 to a second outer diameter D5, where the outer diameters are measured from a straight line T1 contacting one side of the outer edges 123 of the threads 122 of the first helical thread formation to a second straight line T2 contacting the other side of the outer edges 124 of the threads 122 of the first helical thread formation 120, diametrically across the longitudinal axis A1, as shown in FIG. 2. The tapering of the first helical thread formation 120 causes the outer diameters D6 and D5 to form an angle β with the longitudinal axis A1 (between line T1 and axis A1 and between line T2 and axis A1). In a preferred embodiment, for ¼ inch or smaller diameter anchors, angle β is approximately 1.0 degrees, and is preferably between 0.5 and 2 degrees. For larger size anchors, the angle β could be larger.

Figure 5:
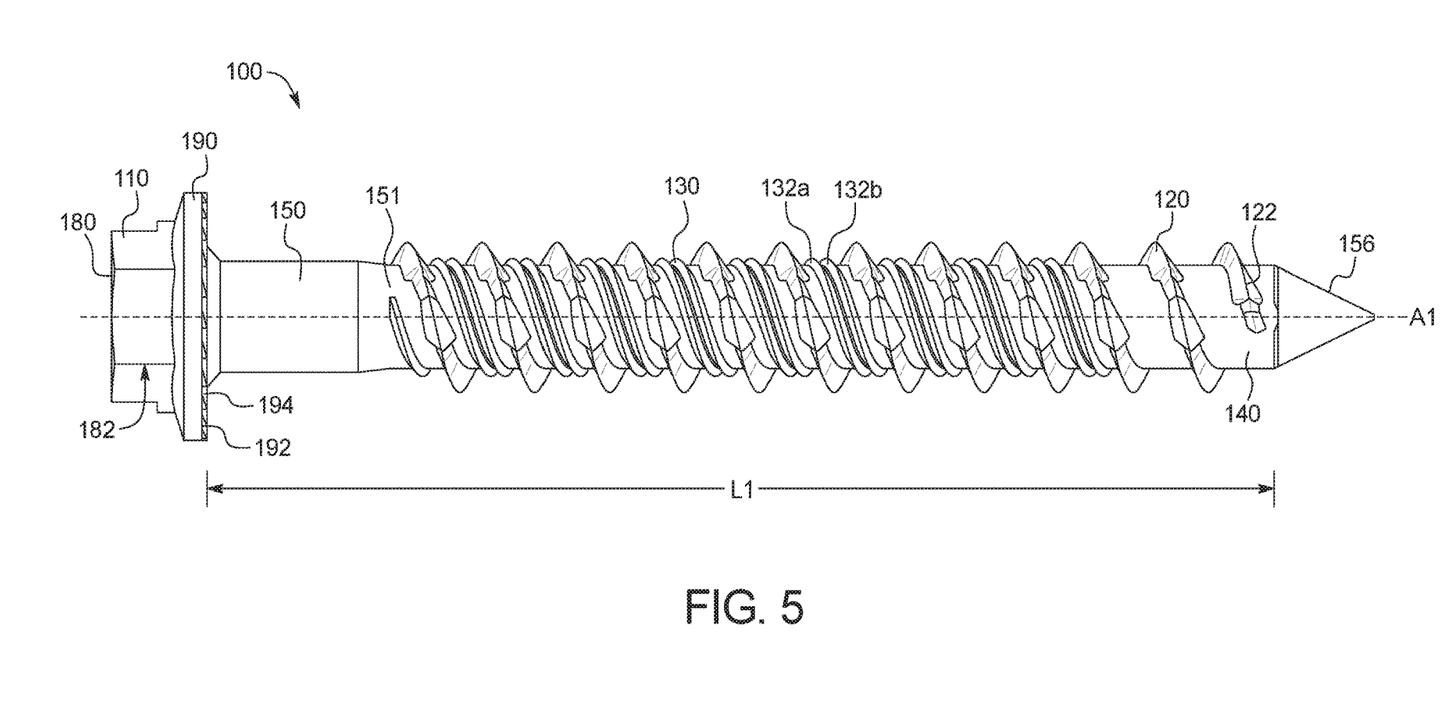
FIG. 5 is a side perspective view of another example embodiment of a threaded fastener of the present disclosure.

The head 110 of the example fastener 100 is depicted in greater detail in FIG. 5. The head 110 includes a top portion 180 spaced from the shank 150, and a bottom portion 190 proximate the shank 150. The top portion 180 of the head 110 defines a mechanical engaging structure 182 which is engageable by an appropriate tool for driving the fastener 100. Thus, in one example embodiment of the present disclosure, the mechanical engaging structure 182 includes a hexagonal shaped bolt head that is engageable by an appropriate tool, such as a socket wrench or impact driver. In other embodiments of the present disclosure, other mechanical engaging structures may be utilized, such as a straight slot (engageable by a flathead screwdriver), a cross-shaped slot (engageable by a Phillips head screwdriver), or a hexagonal shaped cavity (engageable by an Allen wrench). Any known or subsequently developed mechanical engaging structures rotatable or drivable by any one of a variety of tools may be used as the engaging structure 182 in accordance with the present disclosure.

The bottom portion 190 of the head 110 includes a bottom surface 192. The bottom surface 192 generally faces away from the head 110, and towards the tip 156, along the longitudinal axis A1. The bottom portion 190 includes a plurality of ribs 194 extending from the bottom surface 192 and forming extrusions extending from the bottom surface 192. In an embodiment, the ribs 194 are arranged radially around an axis A2 of the head 110, as shown in FIG. 5.

In this illustrated example embodiment, as shown in FIG. 5, each rib 194 includes a leading face 195a and a trailing face 195b that meet at an apex 196 of the rib 194. The leading face 195a forms an angle $\varepsilon_1$ with respect to the bottom surface 192. Similarly, the trailing face 195b forms an angle $\varepsilon_2$ with respect to the bottom surface 192. In this illustrated example embodiment, angle $\varepsilon_1$ is greater than angle $\varepsilon_2$ such that the leading face 195a is at a sharper angle with respect to a object 101, with which the fastener 100 is going to engage, and the trailing face 195b is at a shallower angle with respect to the object 101. In one embodiment, angle $\varepsilon_1$ is greater than 45 degrees, but less than 90 degrees; and angle $\varepsilon_2$ is less than 45 degrees, but greater than zero degrees.

It should be appreciated that each of the fasteners 100 depicted in the Figures is a right-handed threaded fastener 100, such that when they are turned in a clockwise fashion about axis A2 (when looking at the top portion 180 of the head 110), the fastener 100 is tightened or driven, and when turned in a counter-clockwise fashion about axis A2 (when looking at the top portion 180 of the head 110), the fastener 100 is loosened or backed out. Thus, when the head 110 of the fastener 100 is tightened or driven, in a direction shown by rotation R1 in FIGS. 4 and 5, the threads 122 and 132 of the fastener 100 grip the object 101, and the fastener 100 is driven into the substrate 103, causing the ribs 194 to come into contact with the object 101. When the head 110 of the fastener 100 is loosened or backed out, in a direction shown by rotation R2 in FIGS. 4 and 5, the threads 122 and 132 of the fastener 100 release their grip on the object 101, and the fastener 100 is backed out of the substrate 103, causing the ribs 194 to come out of contact with the object 101. In other embodiments of the present disclosure, the fastener 100 is left-hand threaded, causing the fastener 100 to be tightened or driven in direction R1 and loosened or backed out in direction R2.

Figure 4:
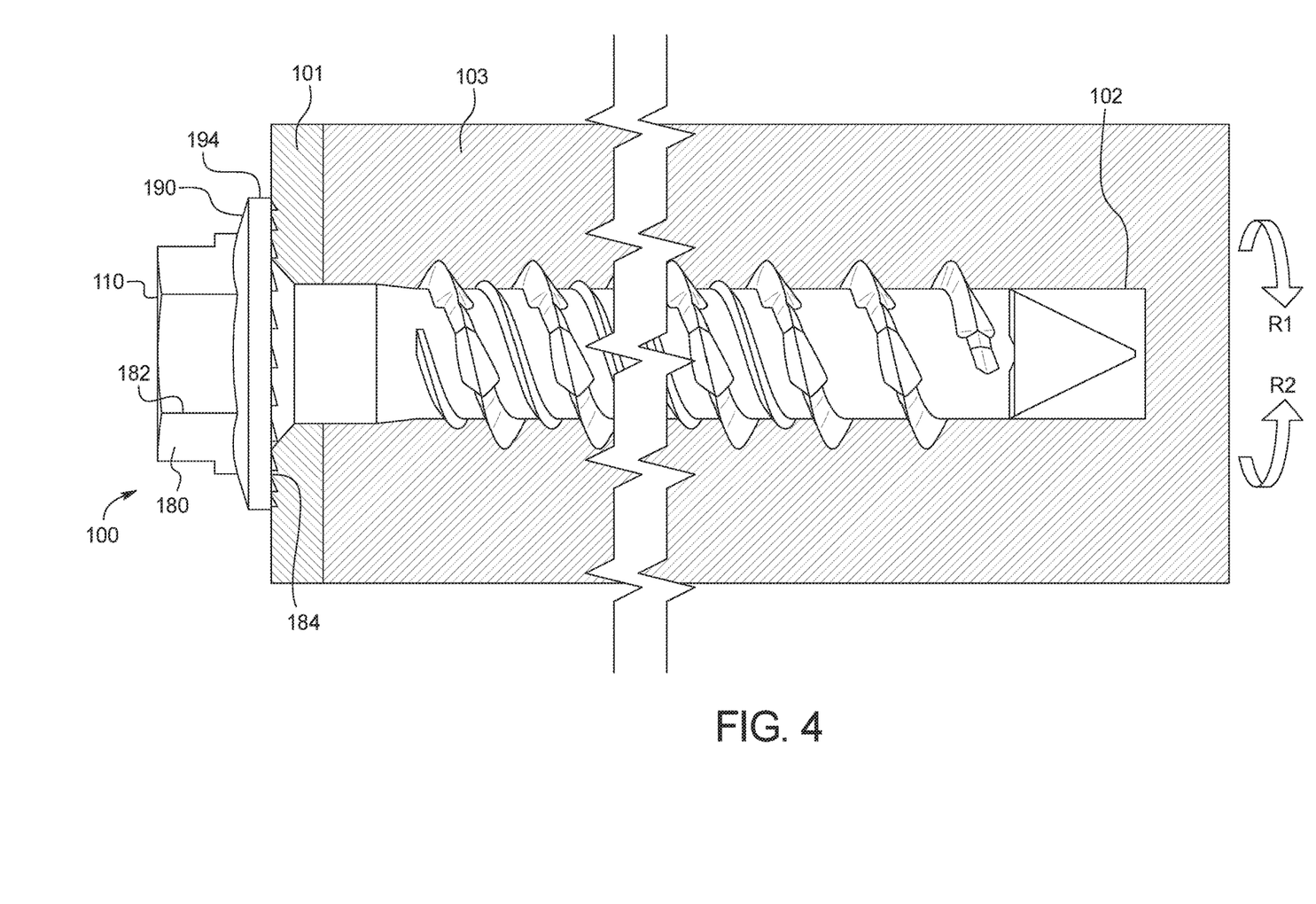
FIG. 4 is a side partial cross-sectional view of the threaded fastener of FIG. 1 shown after having been driven through an object and into a substrate.

As shown in FIGS. 4 and 5, as the fastener 100 is tightened (in direction R1), the apex 196 and leading edges 195a of the ribs 194 come into contact with the object 101 as the fastener 100 is tightened or driven in the direction of rotation R1. Thus, the sharper angle of the leading edges 195 contact the object 101 during the tightening process, creating a frictional torsional resistance to the tightening of the fastener 100 by "biting" into the surface of the object 101 In this way, the leading edges 195a of the ribs 194 provide protection against over tightening of the fastener 100, by causing frictional resistance to the tightening. Conversely, when the fastener 100 is loosened or backed out in the direction of rotation R2, the shallower angle of the trailing edges 195b of the ribs 194 lessen the frictional torsional resistance between the head 110 and the object 101, to enable the fastener 100 to be removed more easily. In addition to the frictional engagement of the ribs 194 with the surface of the object 101, the threads 122 and 132 of the thread formations 120 and 130 frictionally engage the inner surfaces of the cavity 102 of the substrate 103. For example, the cavity 102 may be a recess formed in the substrate 103 by pre-drilling the substrate 103 to accept the fastener 100.

Figure 6A:
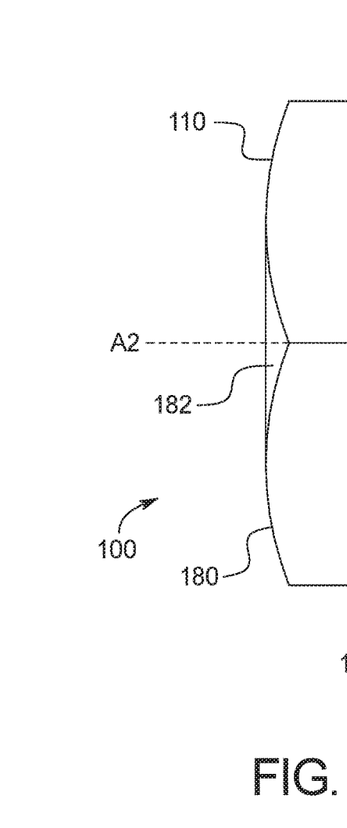
FIG. 6A is a side perspective view of another example embodiment of the head of a threaded fastener of the present disclosure.
Figure 6B:
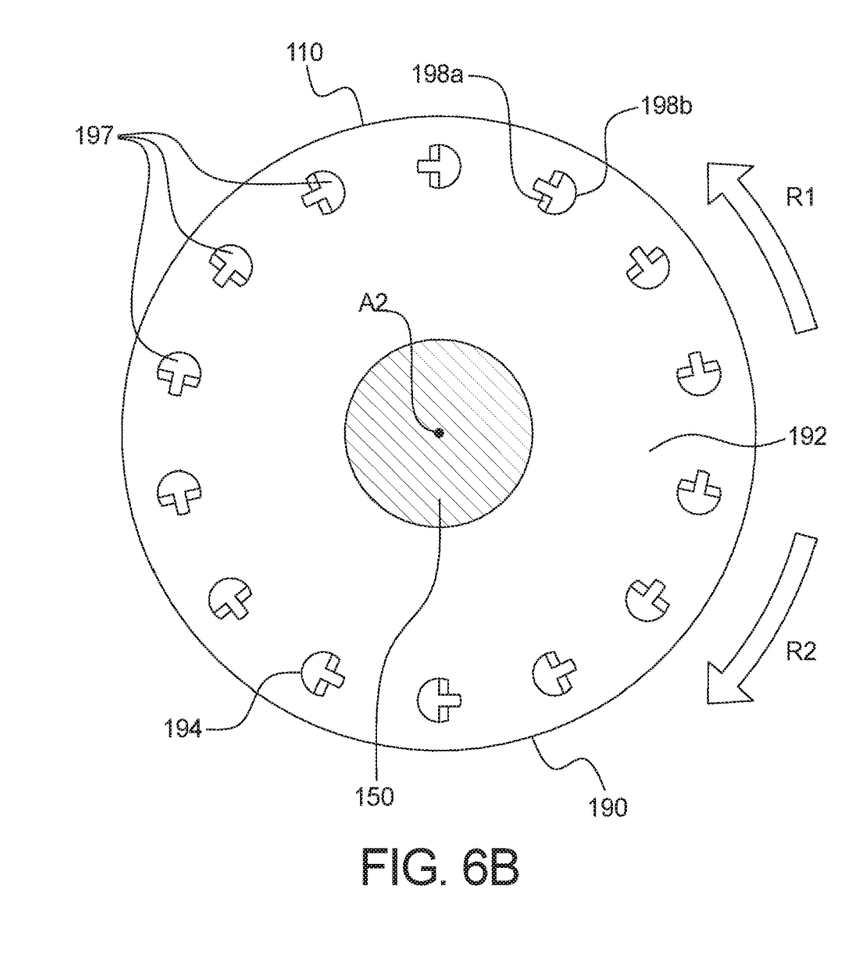
FIG. 6B is a bottom perspective view of the head of the threaded fastener of FIG. 6A.
Figure 7A:
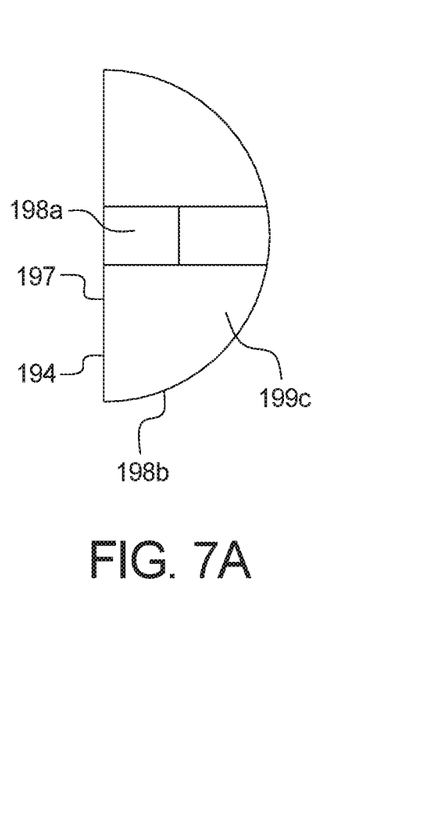
FIG. 7A is a front perspective view of a rib of the head of the threaded fastener of FIGS. 6A and 6B.
Figure 7B:
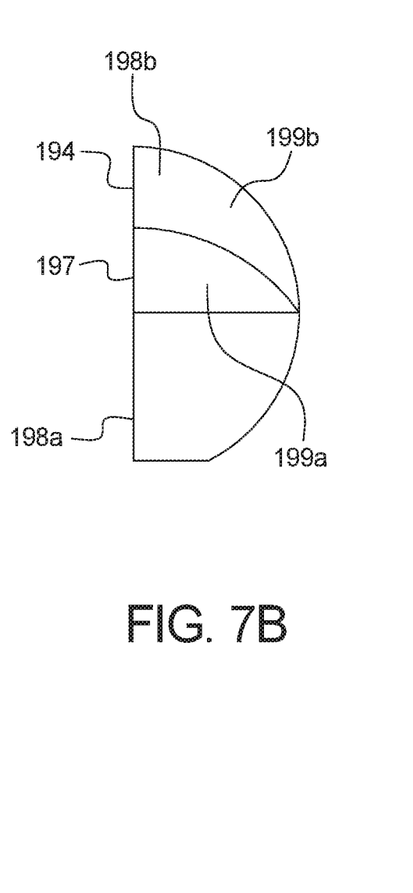
FIG. 7B is a side perspective view of the rib of FIG. 7A.
Figure 7C:
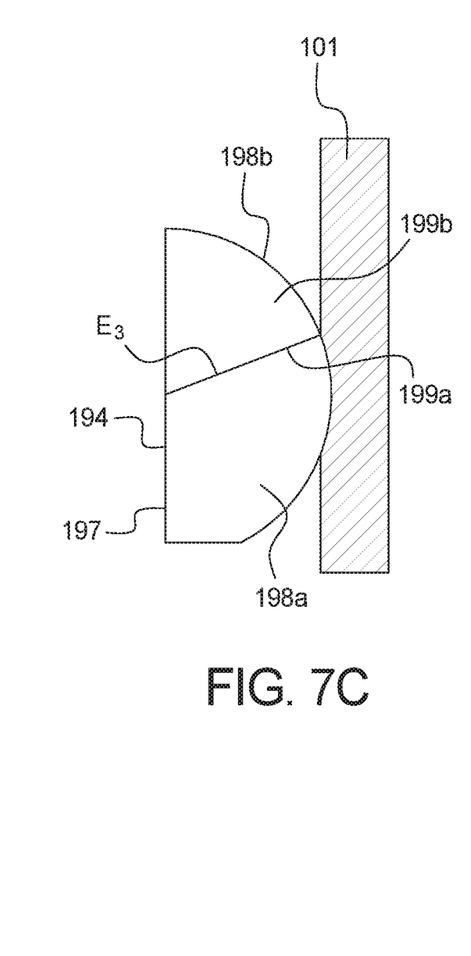
FIG. 7C is a side view of the rib of FIGS. 7A and 7B in frictional engagement with an object.

In an alternative embodiment of the present disclosure, as shown in FIGS. 6 and 7, the ribs 194 are formed by a plurality of shaped detents 197 or extrusions 197 extending from the bottom surface 192 of the head 190. The detents 197 include a leading portion 198a and a trailing portion 198b. The leading portion 198a is configured to have sharp formations so as to grip and "bite" the object 101 as the fastener 100 is tightened and driven into the substrate 103 and the bottom surface 192 approaches and detents 197 come into contact with the object 101. For example, the leading portion 198a of the detent 197 may include a tooth 199a, and a leading face 199b. The leading face 199b may be oriented at an angle $\varepsilon_3$ with respect to the bottom face 192 of the head 110, that in a preferred embodiment is a relatively sharp angle so as to cause the leading face 199b to frictionally engage or "bite" into the object 101 when the fastener 100 is tightened (in direction of rotation R1), similar to the leading face 195a of the embodiment shown in FIGS. 4 and 5. The trailing face 199c of the detent 197 is curved and smoothed, as shown in FIGS. 6 and 7. In this way, the trailing face 199c reduces frictional contact with the object 101 when the fastener 100 is loosened or backed out (in direction of rotation R2), similar to the trailing face 195b of the embodiment shown in FIGS. 4 and 5.

Figure 8:
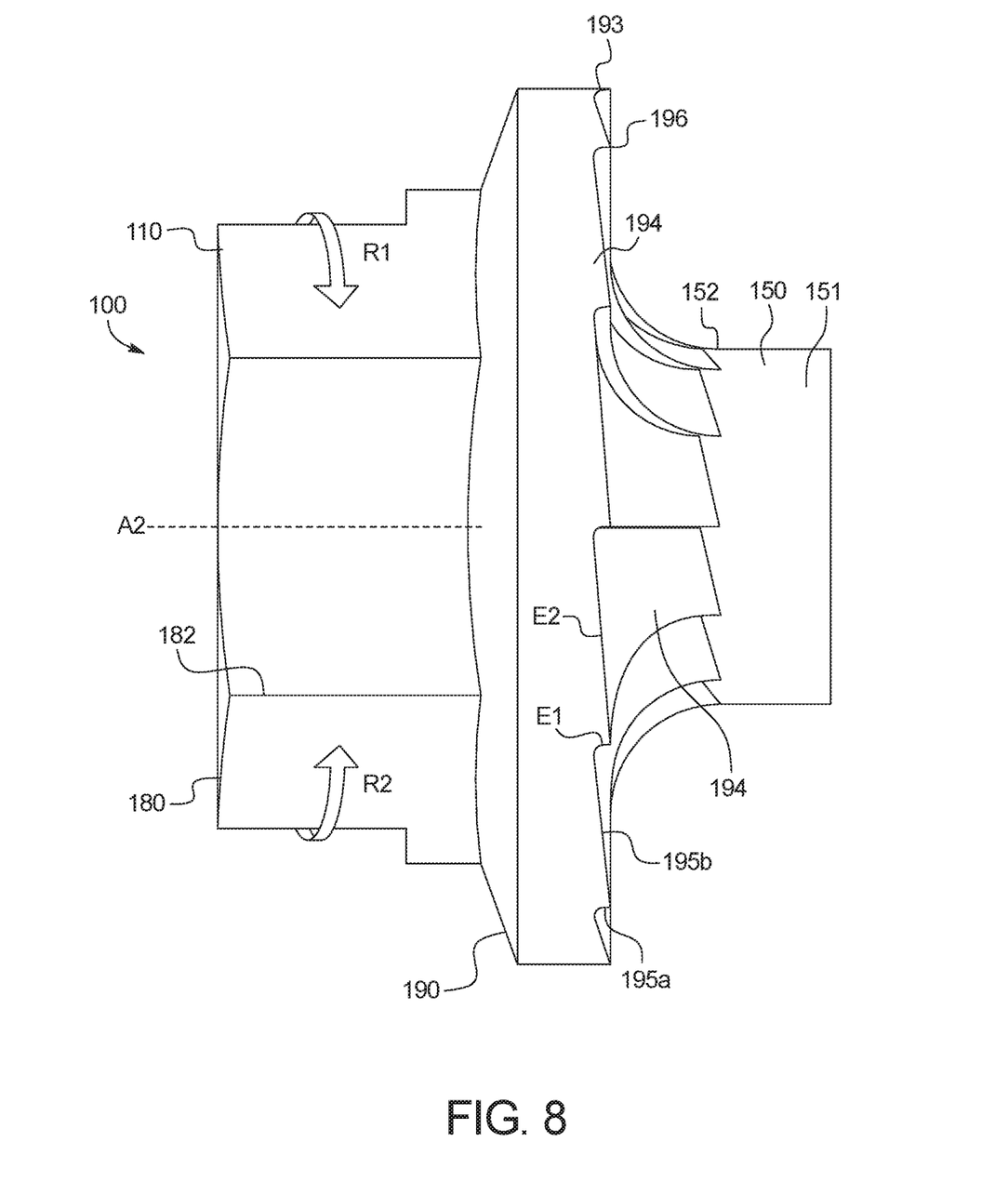
FIG. 8 is a fragmentary front perspective view of another example embodiment of a head of a fastener of the present disclosure.
Figure 9:
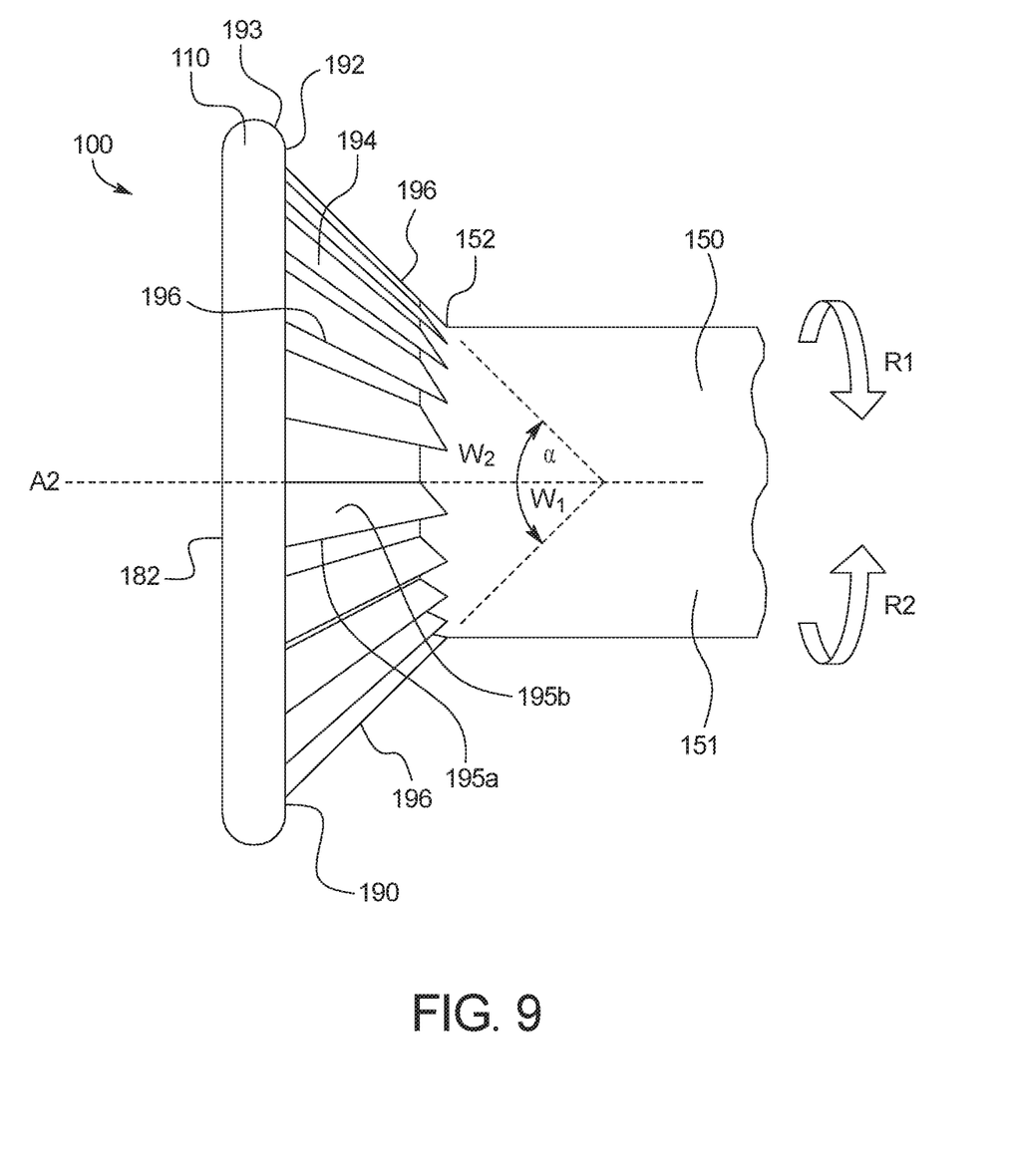
FIG. 9 is a fragmentary front perspective view of another example embodiment of a head of a fastener of the present disclosure.

In yet another alternative example embodiment of the present disclosure, as shown in FIGS. 8 and 9, the ribs 194 extend from the bottom face 192 of the head 110 and onto a portion of the shank 150. For example, as shown in FIGS. 8 and 9, the ribs 194 may be curved and extend from an outer edge 193 of the bottom surface 192 of the head 110 and along the first portion 160 of the shank 150. In this way, a first portion 194a of the rib 194 that is radially closer to the center of axis A2 extends relatively farther from bottom surface 192, while a second portion 194b of the rib 194 that is radially farther from the center of axis A2 extends relatively less from bottom surface 192. This causes the configuration of the ribs 194 to have relatively greater frictional resistance to the object 101 at areas of the bottom surface 192 that are radially closer to the axis A2, and relatively lesser frictional resistance to the object 101 at areas of the bottom surface 192 that are radially distant from the axis A2. In this way, when the fastener 100 is tightened, the curved ribs 194 can mar and "dig" into the object 101 closer to the axis A2 (with the second portions 194b of the ribs 194), while leaving areas of the object 101 farther from the axis A2 relatively less damaged or displaced (by the first portions 194a of the ribs 194). The ribs 194 may be configured to have a radius, or to be otherwise curved, as shown in FIG. 8. Alternatively, the ribs 194 have a straight edge and extend from the bottom surface 192 to the first portion 160 of the shank 150 in a chamfered configuration. In an embodiment, the apex 196 of the ribs 194 are generally angled by an angle $\omega 1$ with respect to the axis A2 of the head 110, as shown in FIG. 9. In the example embodiment shown in FIG. 9, $\omega 1$ is 45 degrees, such that that the total angle $\omega 2$ between the apexes 196 of opposing ribs 194 is approximately 90 degrees.

The various structures and configurations of the threaded fastener of the present disclosure provide significant advantages in reducing the likelihood of torsional failure of the fastener and undesirable failures of the fastener from over tightening. For example, the tapering of the shank 150 along the third portion 166, and the tapering of the first helical thread formation 120 along the third portion 166 provide advantages which reduce the risk of the fastener 100 failing due to overtightening or large torsional forces. Tapering of the first thread formation 120 in the third portion 166 of the shank 150 reduces the localized frictional torques applied to the third portion 166 of the shank 150 due to the decreased diameter of the formation 120 having less contact surface with the substrate 101 in which the fastener 100 is driven. Similarly, providing a shank 150 which tapers in the third portion 166 reduces torsional stresses applied to that area of the shank 150 and concentrates higher torsional stresses in the thicker first portion 160 of the shank 150 closer to the head 110. By reducing the torsional stresses in this third portion 166 of the shank 150, instances of failure from overtightening are significantly reduced.

In various embodiment, the structure and configuration of the head 110 of the fastener 110 further assists in reducing failures from overtightening. Providing an arrangement of ribs 194 on the bottom surface 192 of head 190 creates a frictional impediment to overtightening as the ribs 194 engage a surface of the object 101 and the substrate 103 into which the fastener 100 is being driven. Specifically, providing ribs 194 will a leading face 195a having a relatively sharper angle $\alpha$ enable the ribs 194 to grip or "bite" into the object 101 as the bottom surface 192 comes into contact with the object 101 being attached to the substrate 103 by the fastener 100, thereby causing a frictional resistance to overtightening. However, providing trailing faces 195b on the ribs 194 with a relatively shallower angle $\beta$ enables the fastener 100 to be loosened, backed out and removed much more easily.

Figure 10:
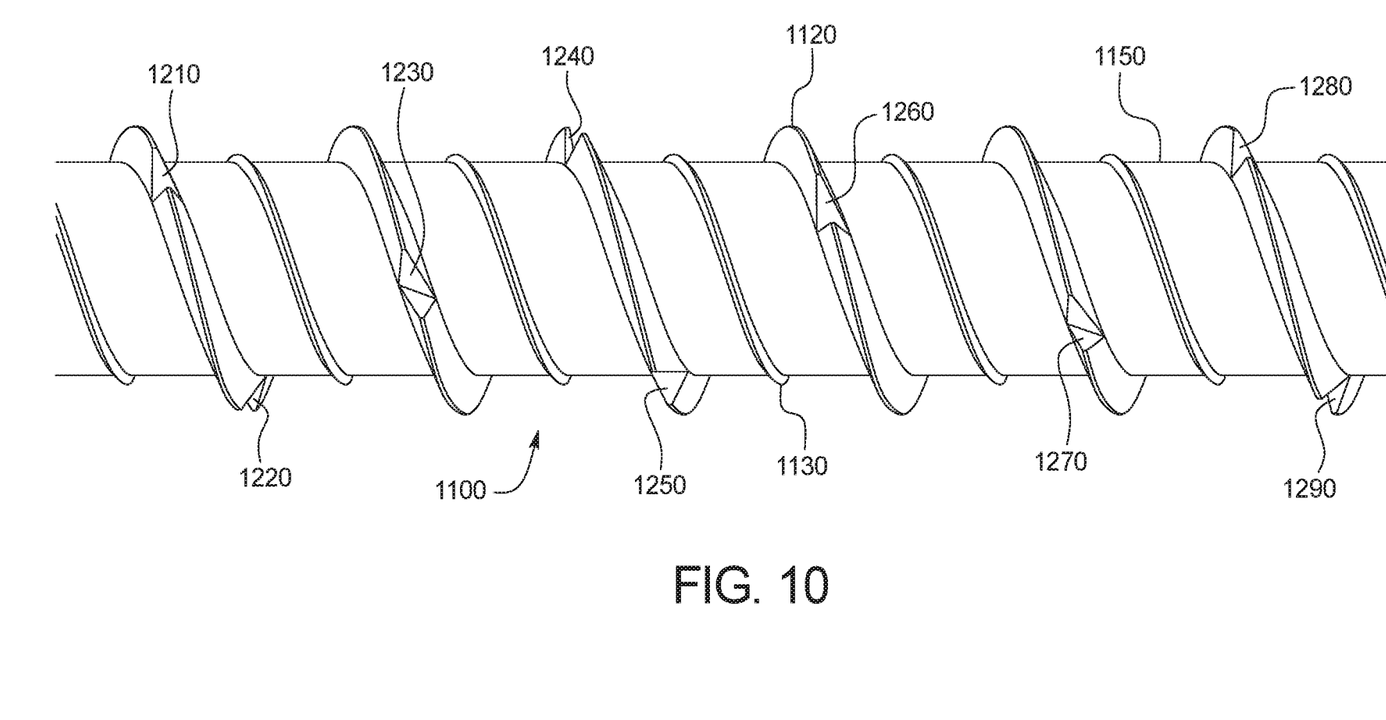
FIG. 10 is a fragmentary side perspective view of another example embodiment of a threaded fastener of the present disclosure.
Figure 11:
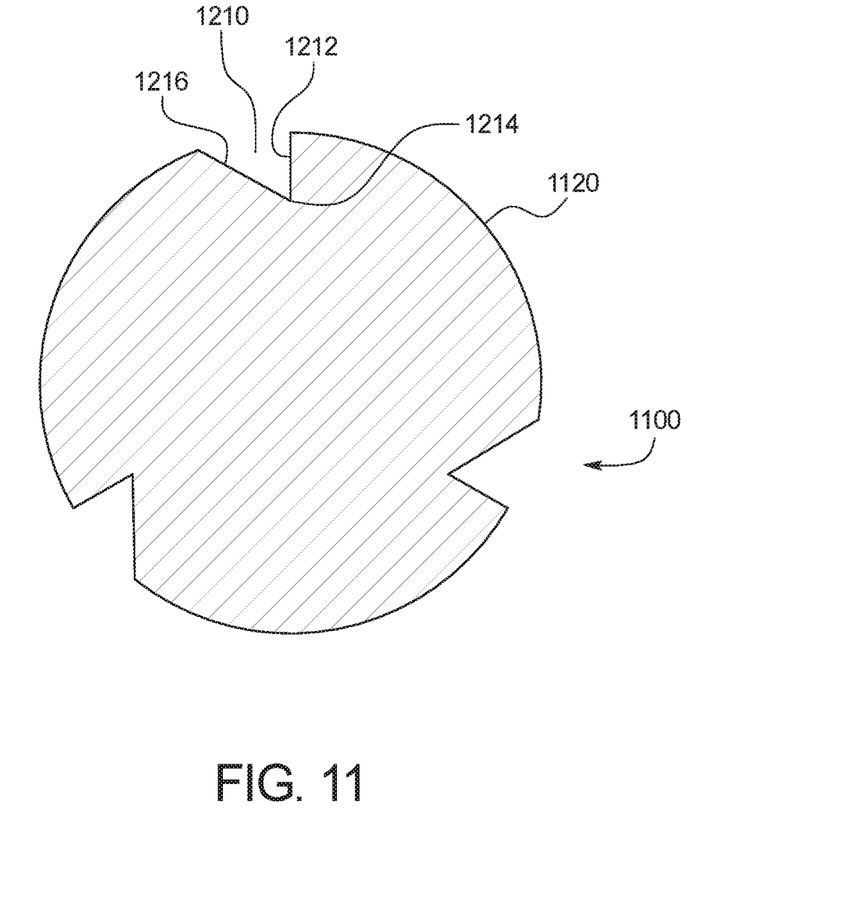
FIG. 11 is cross sectional view of the threaded fastener of FIG. 10.

Referring now to FIGS. 10 and 11, another alternative example embodiment of the threaded fastener of the present disclosure is generally illustrated. In this alternative example illustrated embodiment, the fastener 1100 includes a head (not shown), a shank 1150, a first or primary thread formation 1120 extending outwardly from the shank 1150, and a second or secondary thread formation 1130 extending outwardly from the shank 1150.

In this alternative example illustrated embodiment, the first or primary helical thread formation 1120 of the threaded fastener 1100 is formed with a plurality of grooves such as grooves 1210, 1220, 1230, 1240, 1250, 1260, 1270, 1280, and 1290 that are respectively each partially defined by a straight cutting edge. For example, groove 1210 is defined by a first straight cutting edge or surface 1212 and a second edge or surface 1216. The first straight cutting edge or surface 1212 and the second edge or surface 1216 intersect at an acute angle at or along an intersection line 1214. In certain embodiments, the acute angle is approximately 60 degrees, but it should be appreciated that this angle may vary in accordance with the present disclosure. The straight cutting edge 1216 assists the thread formation or thread 1120 in cutting into the substrate (such as a concrete substrate). This enables the threaded fastener 1100 to form its path more efficiently, reduces necessary installation torque, and reduces the likelihood of breakage of the threaded fastener 1100 during installation or use.

It should be appreciated that all of the grooves are identically configured in this example embodiment, but that one or more of the grooves may be alternatively configured. It should also be appreciated that for this alternative embodiment, the head may be any of the various different heads discussed herein or may be an alternatively configured head. It should also be appreciated that for this alternative embodiment, the shaft may be any of the various different shafts discussed herein or may be an alternatively configured shaft. It should further be appreciated that for this alternative embodiment, the quantity of thread formations may vary. It should further be appreciated that for this alternative embodiment, the configuration of the thread formations (besides or in addition to the grooves) may vary.

It should be appreciated from the above that each of the different alternatives for the head, the shank, and the threads may be combined in any suitable combination in accordance with the present disclosure.

It should also be appreciated from the above, that in various embodiment, the present disclosure provides a fastener including a head; a shank connected to the head at a first end and forming a tip at a second end, the shank having a first portion proximate the head, a second portion adjacent to the tip, and a third portion between the first and second portions, the shank having a longitudinal axis extending from the head to the tip, the first portion having a substantially constant diameter along a length of the shank, the second portion having a substantially constant diameter along the length of the shank, and the third portion having a diameter that decreases along the length of the shank in a direction along the longitudinal axis from the head to the tip; and a first helical thread formation having a thread form thereon formed from two portions disposed upon opposite lateral sides of the thread form, the thread form having a root, the root positioned along the second and third portions of the shank; wherein an outer diameter of the first helical thread formation on the third portion of the shank increases along the length of the shank in a direction along the longitudinal axis from the head to the tip.

In certain such embodiments, the outer diameter of the first helical thread formation is substantially constant on the second portion of the shank.

In certain such embodiments, the fastener includes a second helical thread formation between the first helical thread formation.

In certain such embodiments, an outer diameter of the second helical thread formation is smaller than the outer diameter of the first helical thread formation.

In certain such embodiments, the fastener includes a plurality of second helical thread formations between the first helical thread formation.

In certain such embodiments, an outer diameter of the plurality of second helical thread formations is smaller than the outer diameter of the first helical thread formation.

In certain such embodiments, an outer surface of the third portion of the shank forms an angle α with the longitudinal axis.

In certain such embodiments, the outer diameter of the first helical thread formation on the third portion of the shank forms an angle β with the longitudinal axis.

In certain such embodiments, a is approximately 1 degree, and β is approximately 1 degree.

It should be further appreciated from that above that in various other embodiments, the present disclosure provides a fastener including a head; a shank connected to the head at a first end and forming a tip at second end, the shank have a first portion proximate the head, a second portion proximate the tip, and a third portion between the first and second portions; and a first helical thread formation having a thread form thereon formed from two portions disposed upon opposite lateral sides of the thread form, the thread form having a root, the root positioned along the second and third portions of the shank; the head including a top portion distal from the shank, and a bottom portion adjacent to the shank, the top portion defining an engaging structure engageable by a tool, the bottom portion including a bottom surface and a plurality of ribs extending from the bottom surface arranged radially around an axis of the head, the ribs extending outward from the bottom surface in a direction towards the tip, the ribs configured to frictionally engage a face of a object attachable to a substrate into which the fastener is driven as the ribs approaches and comes into contact with the object being attached to the substrate by the fastener.

In certain such embodiments, the first helical thread formation is formed with a plurality of grooves that are respectively each partially defined by a straight cutting edge.

In certain such embodiments, each of the plurality of ribs includes a leading face and a trailing face, wherein the leading face is configured to engage the face of the object as the fastener is driven into the substrate.

In certain such embodiments, the leading face forms an angle $\varepsilon_1$ with the bottom surface.

In certain such embodiments, $\varepsilon_1$ is greater than 45 degrees and less than 90 degrees.

In certain such embodiments, a portion of each of the plurality of ribs is connected to and extends along the first portion of the shank.

In certain such embodiments, an outer diameter of the first helical thread formation increases in the third portion along the length of the shank in an axial direction from the head to the tip.

It should be further appreciated from that above that in various embodiments, the present disclosure provides a fastener including a head; a shank connected to the head at a first end and forming a tip at a second end, the shank having a first portion proximate the head, a second portion adjacent to the tip, and a third portion between the first and second portions, the shank having a longitudinal axis extending from the head to the tip; and a first helical thread formation formed with a plurality of grooves that are respectively each partially defined by a straight cutting edge.

In certain such embodiments, at least one of the grooves is defined by a first straight cutting edge and a second edge that intersect at an acute angle along an intersection line.

In certain such embodiments, the first portion has a substantially constant diameter along a length of the shank, the second portion has a substantially constant diameter along the length of the shank, and the third portion has a diameter that decreases along the length of the shank in a direction along the longitudinal axis from the head to the tip.

In certain such embodiments, the outer diameter of the first helical thread formation on the third portion of the shank increases along the length of the shank in a direction along the longitudinal axis from the head to the tip.

In certain such embodiments, the fastener includes a second helical thread formation extending from the shank.

It will be understood that modifications and variations may be effected without departing from the scope of the novel concepts of the present invention, and it is understood that this application is to be limited only by the scope of the claims.

The invention is claimed as follows:

1. A fastener comprising:
   a head;
   a shank connected to the head, the shank including:
      a first portion having a substantially constant diameter along a length of the shank,
      a second portion having a substantially constant diameter along the length of the shank, wherein the first portion is closer to the head than the second portion, and
      a third portion between the first portion and the second portion, the third portion having a diameter that decreases along the length of the shank from the first portion to the second portion; and
   a first helical thread formation on the second portion and on the third portion, wherein a diameter of the first helical thread formation on the third portion includes a first diameter adjacent to a first end of the third portion and a second diameter adjacent to a second end of the third portion, the first diameter being less than the second diameter such that the diameter of the first helical thread formation increases along the length of the shank in a direction from the first portion to the second portion.

2. The fastener of claim 1, wherein the diameter of the first helical thread formation is substantially constant on the second portion.

3. The fastener of claim 1, which includes a second helical thread formation on the second portion.

4. The fastener of claim 1, which includes a second helical thread formation on the second portion and on the third portion.

5. The fastener of claim 4, wherein a diameter of the second helical thread formation is less than the diameter of the first helical thread formation.

6. The fastener of claim 1, which includes a plurality of second helical thread formations on the shank between the first helical thread formation.

7. The fastener of claim 6, wherein diameters of the plurality of second helical thread formations are less than the diameter of the first helical thread formation.

8. The fastener of claim 1, wherein the first helical thread formation is formed with a plurality of spaced apart asymmetrical grooves each defined by a first straight cutting edge and a second edge that intersect along an intersection line.

9. The fastener of claim 8, wherein for each of the plurality of spaced apart asymmetrical grooves, the first straight cutting edge and the second edge intersect at an acute angle.

10. The fastener of claim 9, wherein for each of the plurality of spaced apart asymmetrical grooves, the acute angle is approximately 60 degrees.

11. The fastener of claim 1, wherein the second portion of the shank includes a tip.

12. A fastener comprising:
    a head;

a shank connected to the head; and a first helical thread formation on the shank and formed with a plurality of spaced apart asymmetrical grooves each defined by a first straight cutting edge extending radially from a center of the shank and a second edge that intersects the first straight cutting edge along an intersection line.

13. The fastener of claim 12, wherein for each of the plurality of spaced apart asymmetrical grooves, the first straight cutting edge and the second edge intersect at an acute angle.

14. The fastener of claim 13, wherein for each of the plurality of spaced apart asymmetrical grooves, the acute angle is approximately 60 degrees.

15. The fastener of claim 12, wherein each of the plurality of spaced apart asymmetrical grooves are identically configured.

16. The fastener of claim 12, wherein the shank includes a first portion having a substantially constant diameter along the length of the shank, a second portion having a substantially constant diameter along the length of the shank, and a third portion between the first portion and the second portion, the third portion having a diameter that decreases along the length of the shank from the first portion to the second portion.

17. The fastener of claim 16, wherein a diameter of the first helical thread formation on the third portion of the shank increases along a length of the shank in a direction from the first portion to the second portion.

18. The fastener of claim 12, which includes a second helical thread formation extending from the shank.

19. The fastener of claim 12, wherein a diameter of the second helical thread formation is less than the diameter of the first helical thread formation.

20. The fastener of claim 12, which includes a plurality of second helical thread formations between the first helical thread formation.

21. A fastener comprising:
a head;
a shank connected to the head; and
a first helical thread formation on the shank and formed with a plurality of spaced apart asymmetrical grooves each defined by a first straight cutting edge and a second edge that intersects along an intersection line at an acute angle of approximately 60 degrees.

* * * * *